United States Patent [19]

McKenney et al.

[11] 4,305,005
[45] Dec. 8, 1981

[54] LOAD CONTROLLER

[75] Inventors: James L. McKenney, Norwell, Mass.; Robert H. Stevenson, Barrington, R.I.

[73] Assignee: Vapor Corporation, Chicago, Ill.

[21] Appl. No.: 5,304

[22] Filed: Jan. 22, 1979

[51] Int. Cl.³ .................. H02J 4/00; G05D 23/19
[52] U.S. Cl. ........................... 307/31; 307/39; 219/483; 219/486
[58] Field of Search .................. 307/31, 34, 35, 38, 307/39, 117; 165/12; 219/485, 486, 483, 484, 490, 492, 494, 510; 361/161, 162, 170

[56] References Cited

U.S. PATENT DOCUMENTS 3,787,729  1/1974  Bennett .................. 307/117
4,106,690  8/1978  Tomlinson .................. 165/12

FOREIGN PATENT DOCUMENTS 420405   11/1934  United Kingdom .
1146256  3/1969   United Kingdom .
1228722  4/1971   United Kingdom .
1277589  6/1972   United Kingdom .
1543564  4/1979   United Kingdom .

Primary Examiner—L. T. Hix
Assistant Examiner—Stafford D. Schreyer
Attorney, Agent, or Firm—Francis J. Lidd

[57] ABSTRACT

A load controller, primarily intended for use in systems having geographically distributed, energy utilizing loads, and employing stored energy heating apparatus. The controller (1, 10) disclosed, in conjunction with a stored energy heater (3, 4), when installed on an energy distribution system having a multiplicity of heaters and controllers, adjusts individual heater storage (3), providing adequate energy for varying heat requirements of individual heaters after a mandatory "off" period (46, 47, 49, 51), thereby greatly reducing the overall peak energy or demand requirements on a central energy source.

7 Claims, 7 Drawing Figures

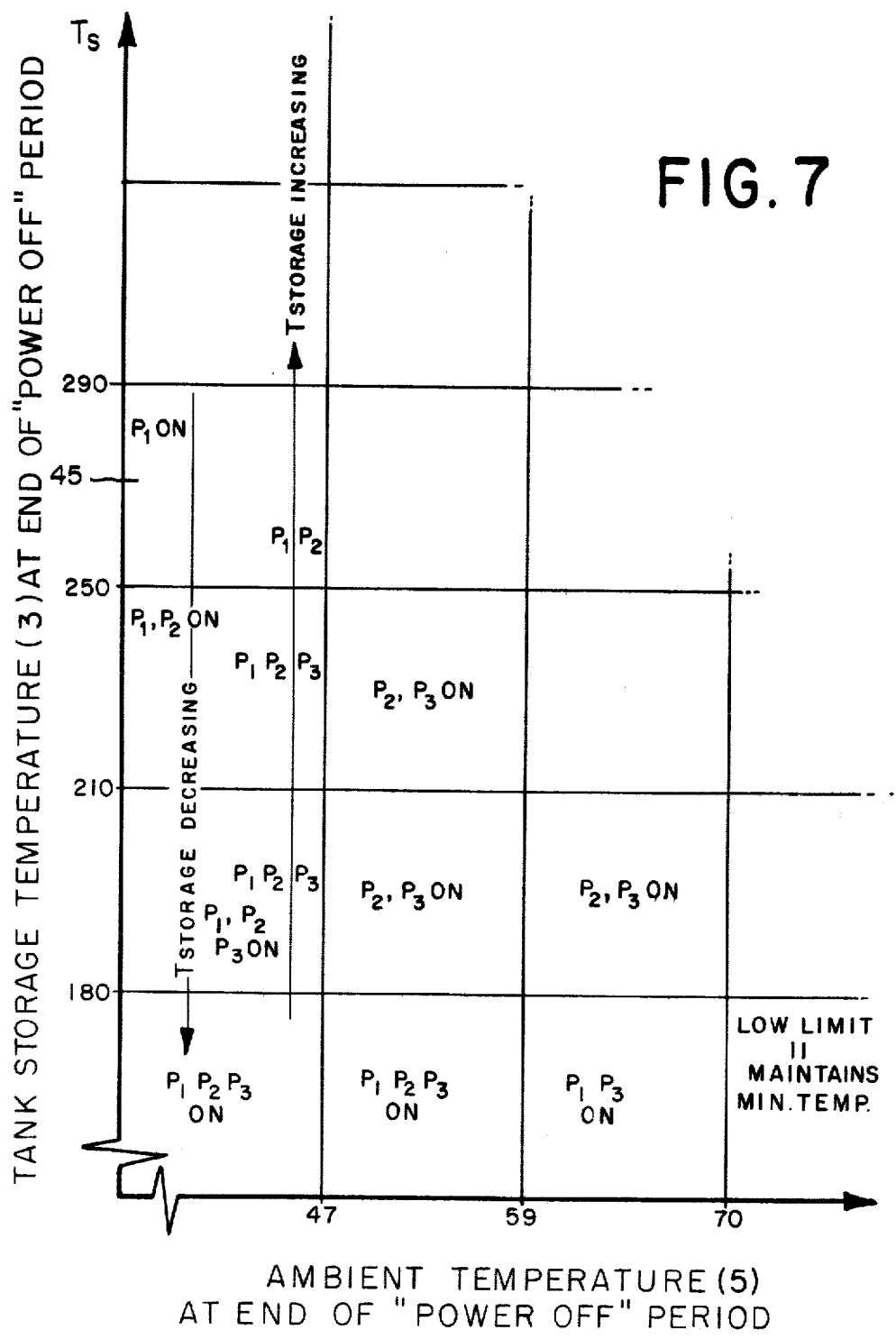

LOAD CONTROLLER

DESCRIPTION

1. Background of the Invention

This invention relates generally to peak demand control on utility electrical systems, and more particularly concerns the reduction of a secondary peak of power drawn by a number of distributed electrical loads using energy storage equipment.

Prior are U.S. Pat. Nos. 3,906,242, 4,023,043, 3,630,275, and 3,422,248, hereby fully incorporated by reference, disclose methods of controlling peak loads on electrical utility distribution systems, and stored energy electrical heating apparatus respectively. Operation of the above mentioned apparatus has been highly satisfactory and many units are in operation, effectively providing utilities with an "interruptable" load for pre-determined periods. Use of this type of heater allows the electrical utilities to essentially even out demand over a twenty-four hour period. This reduction in demand "peaks" results in substantial financial savings to the utilities in that extra generating capacity need not be installed, or higher cost "peaking" power need not be used.

The central control systems disclosed in U.S. Pat. No. 3,906,242 and 4,023,043, however, have not found wide use due to the involved and difficulties in maintaining individual signal responsive equipment located at the site of each stored energy heater. Therefore, it has become common practice to control the power off period of individual stored energy loads through the use of a simple time clock attached to each unit providing cycles of power on and power off periods. "Power on" periods are usually in the range of four to twelve hours in a twenty-four hour period although other cycles are used, some having more than one "power on" period in 24 hours.

However, when a substantial number of units are connected to a given utility system it has been found that after a power off period, a high percentage of the storage loads are operating at reduced temperature due to the heat draws during the power off interval. If a simple temperature controller is utilized to establish a maximum limit in the energy storage, at the conclusion of each power off period, a large number of units will be connected to the utility lines thereby producing what has become known as a "secondary peak".

Secondary peaks, while greatly reduced from the prior or primary peak, are still undesirable. Therefore, it is the object of this invention to provide a controller which utilizes the existing stored energy temperature, and the ambient temperature, in a predetermined combination to provide a diversity of power demands among a plurality geographically distributed of stored energy heaters connected to a utility system.

It is a further object of this invention to provide a method for reducing "secondary peaks" on an electrical utility through the use of a self-contained, self-operating controller which automatically adjusts the power requirements of the individual stored energy heater to minimize the power draw after a substantial power off period.

It is a still further object of this invention to provide a method for controlling secondary peaks which is locally adjustable to individual loads and thereby provides substantial diversity in overall power requirements for a plurality of connected stored energy heaters on a given utility distribution system.

It is an additional object of this invention to provide a controller for a stored energy electrical heater which continuously measures the storage temperature, ambient temperature, and provides self-determined adjustment of the unit power requirements after a substantial "power off" period.

While the controller and method will be described in connection with a preferred embodiment utilizing temperature sensitive, electro-mechanical devices employed in novel circuitry, it will be understood that this embodiment does not limit the invention to the electro-mechanical or thermo-mechanical approach. On the contrary, the invention disclosed here also contemplates utilizing electronic storage, and logical circuitry to similarly provide individual and locally adjusted power demands. Use of micro-processors, and non-volatile semiconductor memories, interfaced with the load and utility lines to provide a minimum demand for individual heaters after a power off periods is also contemplated.

BRIEF DESCRIPTION OF THE DRAWINGS

FIG. (1) Block semi-schematic energy flow diagram showing controller used with stored energy heater in typical heating application.

FIG. (2) Typical control panel of the controller showing adjustment dials, and seasonal selector switch.

FIG. (3) Circuit diagram of a 3 stage controller.

Figure 1:
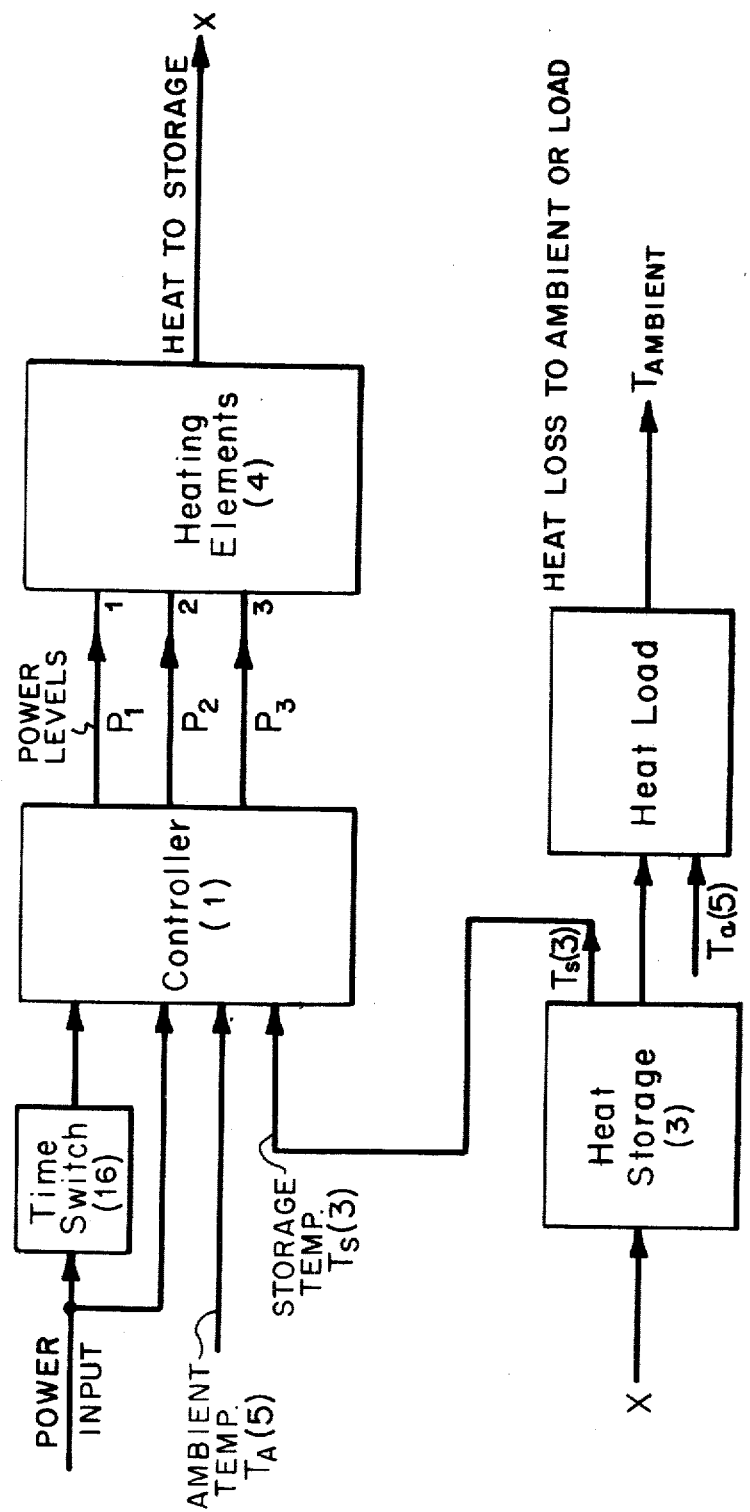

FIG. (4) Time/storage temperatures diagram of a typical application such as shown in FIG. 1 wherein the heated system is a dwelling or similar structure.

Figure 4:
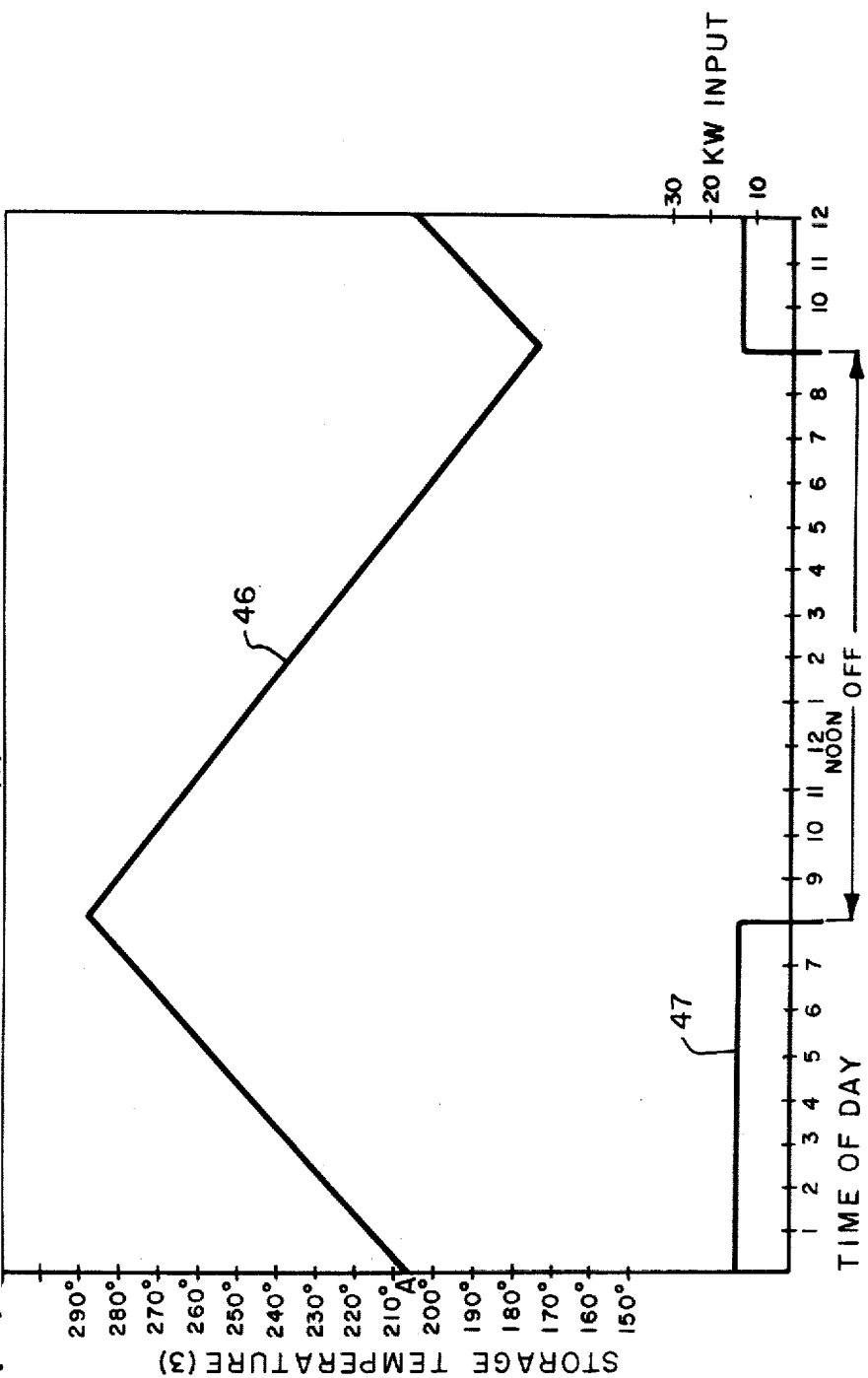

FIG. (5) Time/storage temp diagram of the system of FIG. 4 at a different ambient temperature.

FIG. (6) Time/storage temp diagram of the system of FIG. 4 at another ambient temperature.

FIG. (7) is a graphical representation of the power-ambient temperature relationship for the disclosed embodiment of the invention showing functional relationship between storage, and ambient, temperatures, and level of power input to the heater.

DETAILED DESCRIPTION OF THE INVENTION

Figure 2:
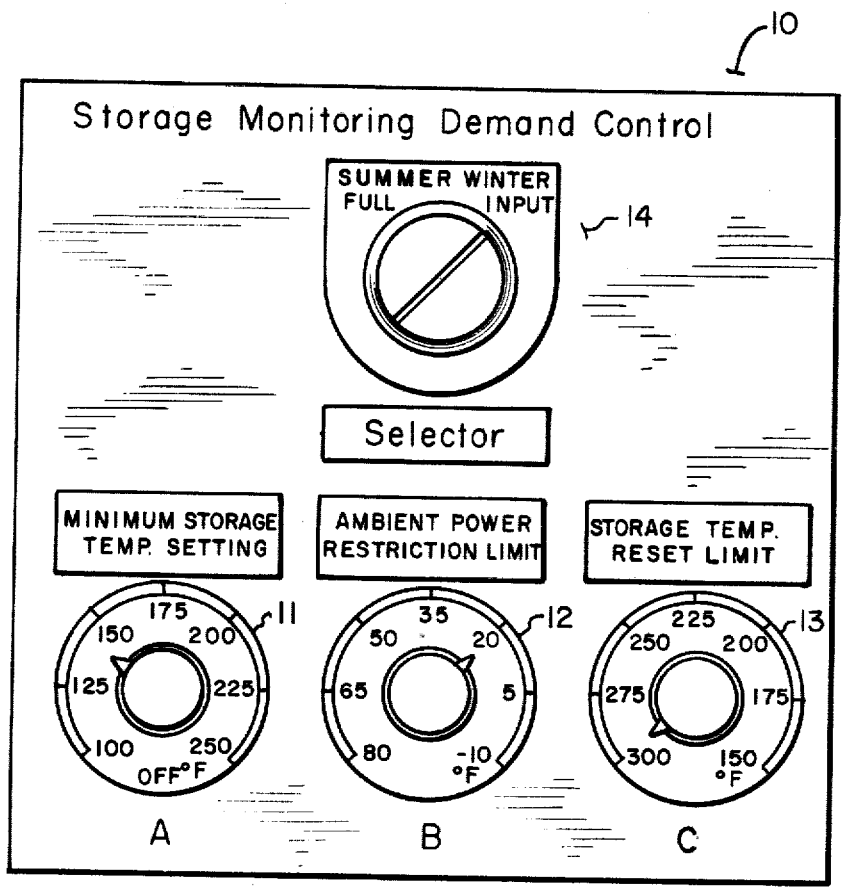
Figure 3:
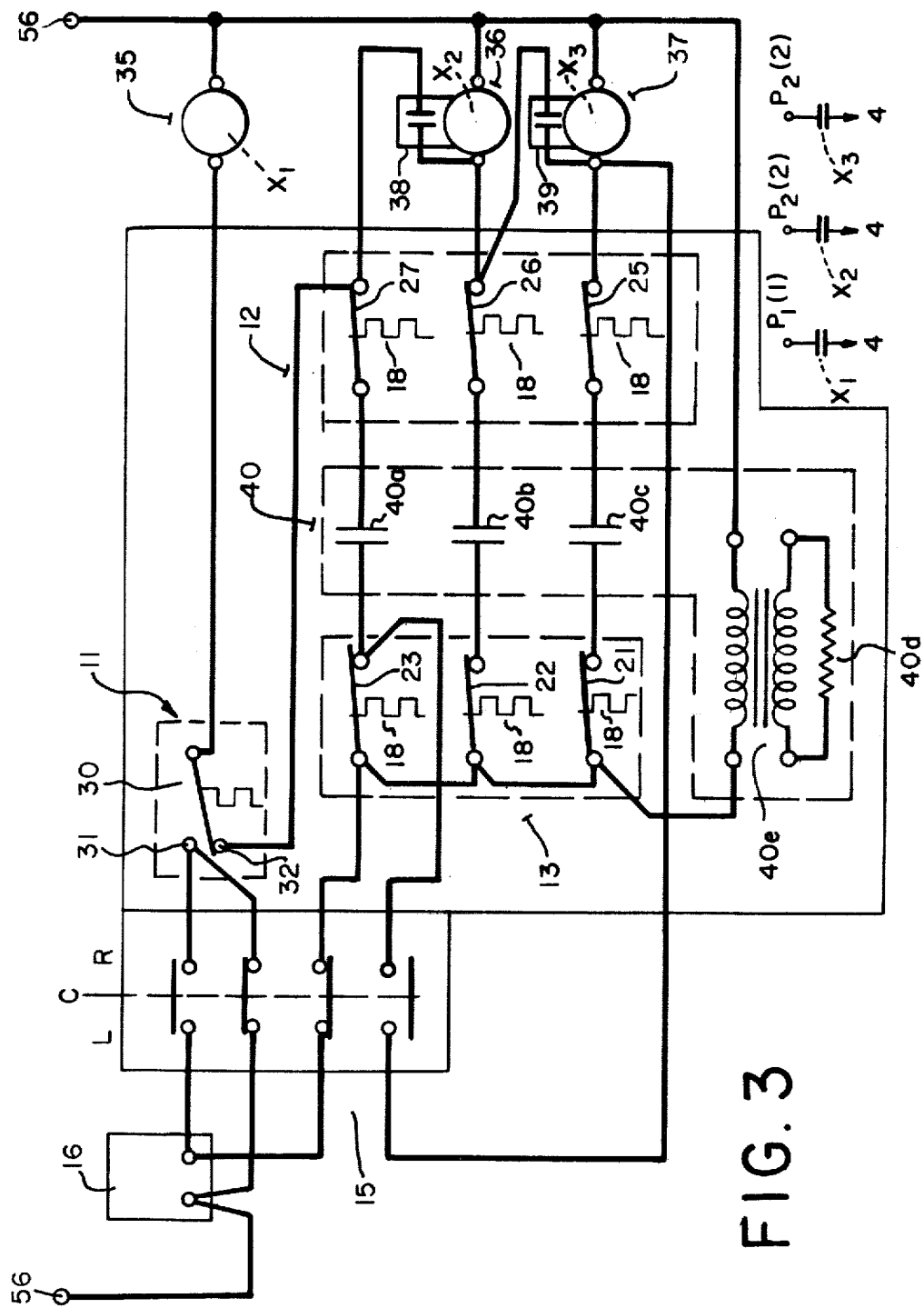

The following refers to FIGS. 1, 2, and 3, that is, with a controller operating in the system shown in FIG. 1, wherein the controller 1 is an embodiment having the dial arrangement of FIG. 2 and circuitry according to FIG. 3, and the selector 14 in the winter position. A particularly novel feature of the invention lies in the utilization of three temperature "spans" for the temperature sensitive elements generally indicated as 12 and 13 in FIG. 3.

In the exemplary but not exclusive embodiment disclosed, the total temperature range of 12 and 13 is divided into three segments or spans as are the power levels P1, P2, and P3 indicated in FIG. 1. This is accomplished by energizing contactor coils 35, 36, and 37 through thermally actuated contacts 21-27, and associated power contacts 41, 42, and 43, thus energizing heating elements 4 at discrete power levels P1, P2, and P3, from line source 56 or other suitable electrical supply. Sequence controller 40, not a part of this invention provides regulatory time delays in applying power to the heating elements 4. In operation, contacts 40a, 40b, and 40c are mechanically actuated by electrical heating of thermal element 40d, after voltage is applied to the primary of transformer 40c. In this way delays in energization and de-energization of the heating elements providing power inputs P1, P2, P3 are achieved. Delay intervals, however, associated with this controller are aimed at minimizing light flicker and line voltage variation, are short in duration and the controller is only included in the disclosure only for the sake of completeness. In the instant case, if the operating or ambient temperature range of 12 is 35° to 70° F. for a dial setting of approximately 30° F., this span of 35 degrees (i.e. 70.−35.) divided by three establishes approximate temperature set points for switches 27, 26, and 25 of 70° (start of span), 59° (ambient plus two thirds span), and 47° (ambient plus one third span) degrees Fahrenheit respectively. Switches 25, 26, and 27 are actuated sequentially by the thermal element of switch 12 opening at temperatures above their setting, and closed below. Similarly, given a range of storage temperature for 13 of 170 to 290 degrees, three storage limit setpoints of 210, 250, and 290 degrees Fahrenheit are provided. The power levels of 6 kilowatts, 12 kilowatts, and 18 kilowatts, i.e. increments of 6 kilowatts are also exemplary only and represent more or less typical heat losses of the structure having a thermal performance indicated in FIGS. 4, 5, and 6.

It should be noted that although the disclosed embodiment employs temperature sensitive elements 11, 12, and 13, having thermostatic actuating elements 18, and temperature setting dials A, B, and C. utilizing thermostatic switches operating in preset temperature ranges, many other devices could be used to provide similar functions. These would include temperature sensitive resistances, operating in conjunction with electronic apparatus providing electrical signals indicative of the various temperatures.

In operation, assuming that the timer 16 providing electrical power from line source 56 thru internal contacts at preset power-on and "power-off" intervals, has gone through a power off period, at the end of that period, the selector 14 is enabled and as will be described below, depending on the conditions of the controller elements, power draws of 6, 12, and 18 kilowatts are initiated. For the case disclosed, assuming that the outside or ambient temperature is less than 47 degress with contacts 25, 26 and 27 closed, and the temperature of storage 3 as measured by the thermal element 18 of 13 is less than 290 degrees and greater than 250 degrees Fahrenheit with contacts 21 and 22 open, and 23 closed, contactor 35 would be energized via the high contact 32 of 11 since the thermal element of 13 and associated Contacts 31 and 32 are set to close 31 and open 32 above a predetermined minimum storage temperature, i.e., 180° F. and contacts 23 and 27 respectively of switches 13 and 12 now supply six kilowatts of power to storage. This condition is indicated at the location 45 of FIG. 7. Selector 14 provides a circuit change for reduced storage and/or non space heating operation, and are not a part of the disclosed invention. As disclosed, the controller is functioning in the maximum storage or winter position.

In the event that after the power off period, the ambient or outside temperature 5, of the structure being heated, as measured by the thermostatic element of controller 12 is again below 47 degrees, and therefore contact 27 is the "closed" position, and the heat draw, or heat removed from storage was such that the storage temperature as measured by the temperature sensitive element 13 of controller 11 was below 250 degrees, referring to the circuit of FIG. 3, it can be seen that contact 22 and 23 would now be in the closed position allowing energization of the additional contactor 36 providing a second increment of power. At this point, $P_1$ and $P_2$ are "on" drawing 12 kilowatts of power from utility lines.

It should be noted that due to the action of the interlock or "stick" contact 38 a normally open contact actuated by unit 36, as heat is stored and the temperature of storage increases, it will be necessary for that storage temperature to exceed the temperature of contact 22 and 23 of thermostat 13, before the electrical energy controlled by contactor 36 is interrupted. This feature provides a margin of safety and provides essentially increased sensitivity to temperature drop of the storage as opposed to temperature rise. Those skilled in the art will notice that a similar interlock or "stick" contact 39 is provided which requires that storage temperature once having dropped below the setting of contact 21 rise above the contact temperature setting of 23 before power draw is reduced. As those skilled in the art will additionally notice, a controller can, as described above, provide varying power draw as shown in FIG. 7 for various combinations of ambient temperature and residual storage temperature at the initiation of the "power on" period.

Figure 5:
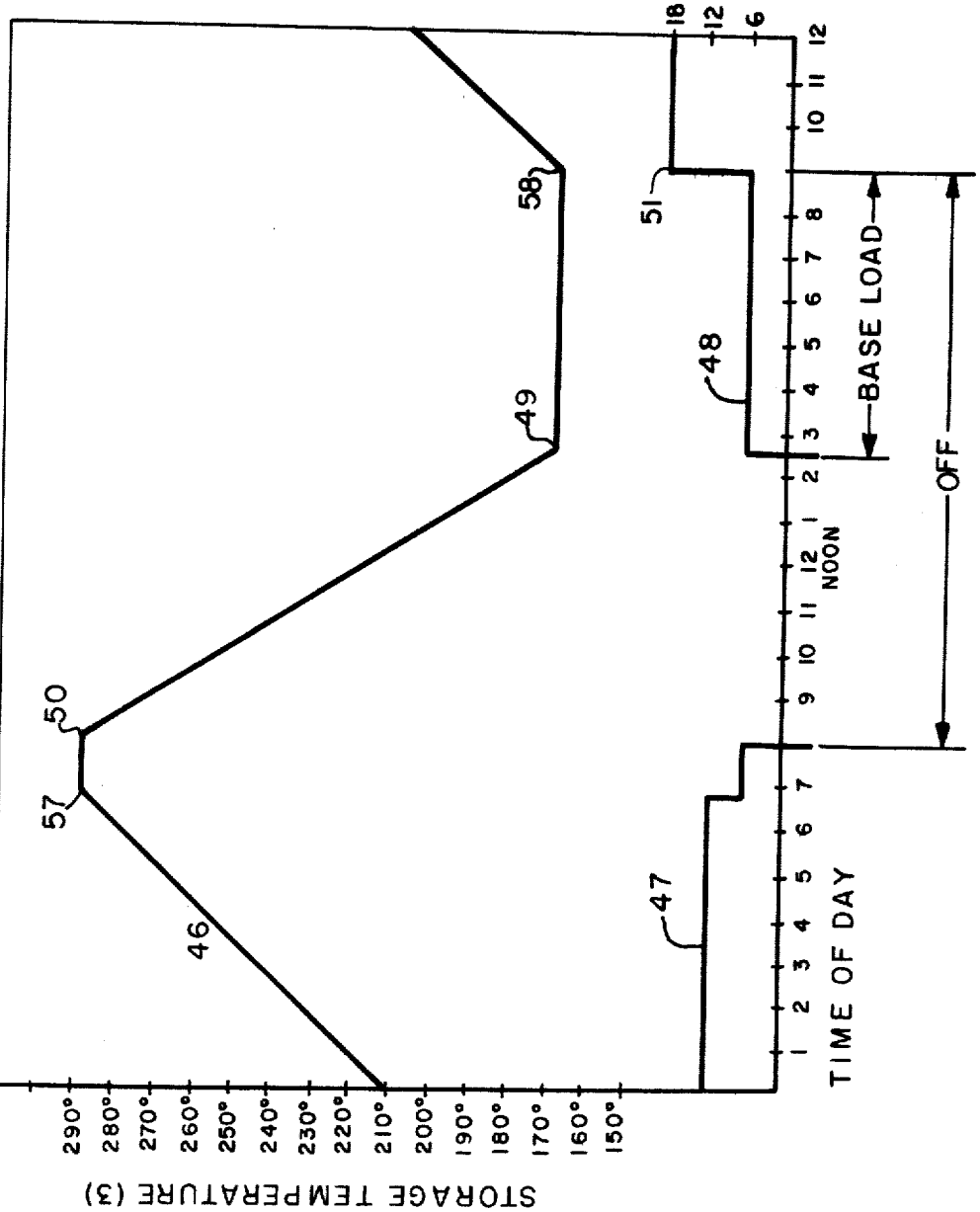
Figure 6:
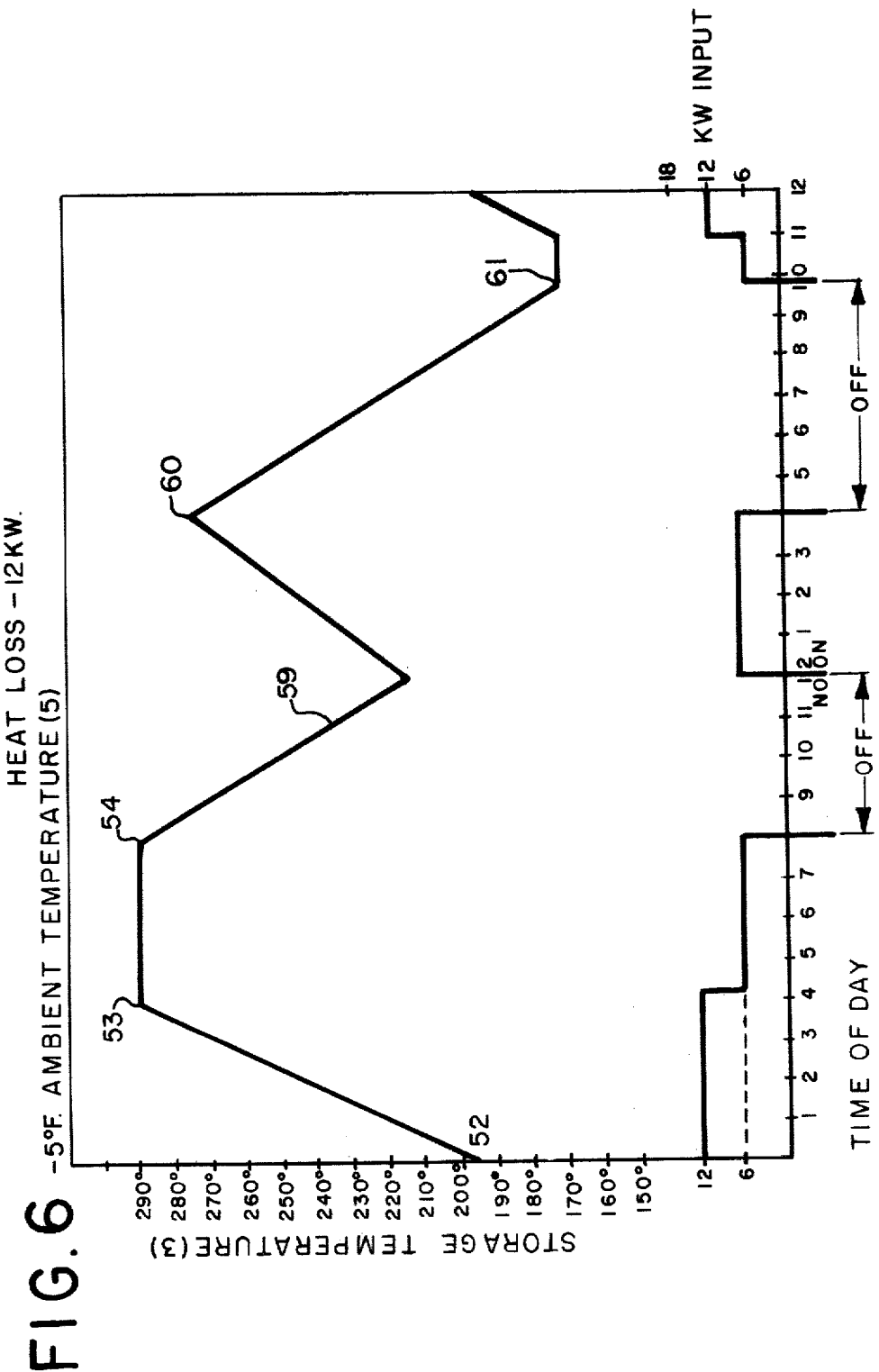

In further reference to the above controller action and FIGS. 4, 5, and 6, it can be seen that operation is such as to either eliminate or greatly reduce the initial power draw from a plurality of stored energy heaters at the termination of the power off period. More particularly, in reference to FIG. 4, where heat or storage temperature 46 and total heater power draw is shown at 47 over a 24 hour period, it will be noted that the storage period from 9 PM to 8 AM provides sufficient stored heat to satisfy load requirements over the succeeding power off period from 8 AM to 9 PM. As indicated in FIG. 4, the controls 12 and 13 are set at 35 degrees and 170 degrees Fahrenheit respectively. As discussed above, switches 25, 26, 27, and 21, 22, and 23 provide an ambient span of 35 to 70 degrees Fahrenheit and a storage temperature span of 210 to 290 degrees Fahrenheit respectively. It should be noted that the ambient or outside temperature 5 (ref FIG. 1) is as indicated, 35 degrees.

In reference to FIG. 5, which is as the above discussed system, a controller, load, and heat input, as shown in FIG. 1, having control settings identical to those of FIG. 4. However, in this case, the load operation is in an ambient or outside temperature of 5 degrees Fahrenheit. The resulting increased heat loss, due to the lower ambient temperature, results in the tank storage temperature falling below the minimum temperature as set by controller 11 and switch elements 30, 31, and 32. Therefore, as indicated in the wiring diagram of FIG. 3, when the contact arrangement 31 and 30 are enabled, i.e., the storage temperature having dropped below the minimum preset value, the time clock is essentially bypassed, energizing contactor 35 and applying the minimum input to the storage and providing a "base load" 48 of 6 kilowatts during the power off period, the base load temperature is shown on FIG. 5 at point 48.

This feature provides heat input to storage and load on the utility which allows a predetermined minimum level of power to be supplied to loads in the event of a sudden or unanticipated demand, such as very low temperatures, high wind losses, and the like. Note that at point 51 as the power on period is initiated, the controller establishes the maximum power draw of 18 kilowatts.

In further reference to FIG. 5, point 57 indicates that the storage temperature had reached its maximum prior to the end of the power on period at 8 AM.

Under these conditions the actions of the control 13 through its contact 23 provide an upper limit at the preset temperature of 290 degrees as indicated at 48 and 50. The horizontal line between 48 and 50 is only a representative approximation of the actual storage temperature. It is expected that controls cycling around 290 degrees would produce some oscillation of temperature. Similarly, the horizontal line between 49 and 58 is also a representation and would involve small temperature swings around the minimum temperature of 170 degrees having a frequency and amplitude dependent on the existing load at the time.

In reference now to FIG. 6, as above, the system is as shown in FIG. 1, however, the storage temperature setting has been reduced to 216 degrees setting and the ambient temperature is a −5 degrees Fahrenheit.

Also, the ambient restriction switch or controller 12 is set at −5°, providing span temperatures of −5° F., +20° F., and +45° F. These adjustments are necessitated by a dual off period requirement, i.e. 8 AM–12 noon, and 4 PM–9:45 PM (ref FIG. 6).

Ajustments in span, achieved as indicated above, are required to insure sufficient heat storage in the now decreased "on" period and reduce the "secondary peak". This is accomplished through establishing a minimum storage temperature which will be reached at the "design load", in this case 216° F., determining new spans of 290° F.−216° F.=74° F./3−25° F. and establishing switch points of 216, 240, and 256° F. respectively.

Under these conditions the span adjustments result in energizing the first, second, and third levels of power draw at storage temperatures below 216, 240, and 256 degrees Fahrenheit respectively. Therefore, it can be seen that adjustment of the storage temperature reset limit, i.e., control 13 and its associated contacts, results in increased or decreased sensitivity to the remaining storage temperature through a reduction in the magnitude of span temperature.

Similarly, increased sensitivity to ambient temperature changes is obtained through adjustment of the ambient power restriction limit 12 and its associated switches 25, 26, and 27.

This is accomplished by setting switch 12 to −5° F. and adjusting the "spans" as indicated above to +20° F., and +45° F. Broadened ambient spans provide greater sensitivity to the existing ambient temperature, and provide earlier shut-off at increased ambient temperatures resulting in greater reduction of secondary peak loads at 12 AM and/or 9:45 PM.

In further reference to FIGS. 4, 5, and 6, particularly to the relationship between indicated power levels and storage temperatures, it should be noted that indicated values are "representative" and not exact representation of quantities in any specific situation.

Those skilled in the art will realize that it is impractice to show the experimental functions of varying time constants provided by changing heat inputs and demands. Similarly, the power levels and storage temperatures are "average" values and do not necessarily relate to the temperature/switch points at a given time during the "on" or off periods.

Exemplary of the above are (ref FIG. 6) points 52, 53, 54, 59, 60, and 61. These represent "typical" storage temperatures during "power on" and power off periods for an additionally "typical demand on load extracting heat from storage.

As disclosed above, therefore, a method and controller for minimizing the "secondary peak" demand on a utility system has been provided. The approach involves utilization of readily available indications of the previous demand on a stored energy heating device through monitoring of its temperature at the onset of a power on period. Further sensitivity to ambient or demand controlling temperatures is provided through continuous measurement of a range of predetermined ambient temperature levels which in conjunction with the monitored residual storage temperature in effect predict the requirements for heat during a succeeding power off period. Additional flexibility is afforded by a provision for adjustment of each range of maximum energy storage temperature and the ambient or load demand temperature providing wide flexibility in the combination of preset temperatures.

The method disclosed, allows adjustment of individual heaters so that individual load characteristics can be incorporated to control the power draw during the "power on" period, and minimize the secondary peak at the period onset. Furthermore, the novel controller disclosed here in addition to the provision for "tailoring" a stored energy heater to its individual load incorporates a minimum temperature function, which in the event of a demand having low statistical probability of occurrence, will allow the unit to supply its load with a minimum or base load quantity of energy.

As indicated in the description of the load characteristic of FIGS. 4, 5, and 6, variation in individual storage and load demand can be obtained through adjusting the temperature sensitive elements.

As those skilled in the art of space heating will readily recognize, the wide variety of environmental conditions, associated with geographically dispersed heating loads, such as houses, hotels, and the like, results in a substantial variation in heat losses from system to system. However, if as discussed above each individual heating system, having heat storage, if controlled in a manner which maintains that storage at a common and/or non varying temperature, energy or power demands on the given utility or energy source supplying a substantial number of such loads, will at the end of a "power off" period, would be subject to power demands from essentially all such system, regardless of the level of heat contained in storage at the time.

However, if each load is controlled in keeping with the invention disclosed herein, those skilled in the art will easily see that the level of each load and local ambient temperature will reflect prior use, load characteristics, and the effects of local ambient conditions such as wind, sunlight, and the like. Therefore, individual demands, or loads controlled in a manner taught by the invention, will display a wide variety of reduced power draws on a utility system supplying a large number of heaters after a power off period.

Therefore, the controller disclosed above in conjunction with a stored energy heater provides a diversified load which will greatly reduce the level of power drawn at the initiation of a power on period, thereby reducing the above mentioned "secondary peak" substantially.

Thus, it is apparent that there has been provided in accordance with the above description, a method for controlling a plurality of stored energy heaters operating on a common power source such as utility electric lines which due to storing heat during periods of light loads, can be disconnected resulting in a reduction in peak energy demand, and further, eliminates the secondary peak load on the utility at the time of re-connection initiating a common "power on" period. A controller has also been provided to augment the above method which utilizes highly reliable, commonly available devices to allow individual tailoring of storage and demand to each load in a manner which greatly reduces the statistical probability of a "secondary peak" at the onset of a power on period, after a substantial common power off period. Many alternatives, modifications, and variations of the above system and device will be apparent to those skilled in the art in the light of the foregoing description. Accordingly, it is intended that all such alternatives, modifications, and variations be embraced by the spirit and broad scope of the following claims.

We claim:

1. A controller for an off peak electric water heater having thermal storage comprising:
   a thermally actuated switch responsive to ambient temperatures having outputs for a plurality of discrete predetermined temperatures;
   a thermally actuated switch responsive to storage temperatures having discrete outputs for a plurality of predetermined temperatures;
   means, responsive to pre-selected groups of said ambient and storage temperature outputs, generating discrete heater power level signals;
   means responsive to said power signals for energizing the heater at corresponding predetermined power levels; means enabling said energizing means during cyclic, predetermined time intervals, wherein;
   said power level signals adjust the thermal storage temperature for estimated heater demand between said time intervals.

2. The controller of claim 1, wherein at least one of said storage temperature outputs corresponds to a minimum storage temperature, and energizes said heaters exclusive of said enabling means.

3. The controller of claim 1, wherein said ambient and storage outputs are adjustable.

4. The controller of claim 1 wherein at least two ambient and storage temperatures constitute a span and outputs correspond to predetermined power levels within said span.

5. A controller for a stored energy heating system used to minimize peak demand on electric utilizes, said system having electrically heated thermal storage utilizing a predetermined range of upper temperature limits for storing heat during a preset, cyclic, electric "power-on" followed by "power-off" periods, while continuously supplying varying system heating demands, comprising;
   means responsive to ambient temperatures providing discrete electrical output signals for a plurality of predetermined temperatures;
   means responsive to storage temperatures having discrete electrical output signals for a plurality of predetermined storage temperatures;
   means selectively determining ambient and storage temperature spans composed of pre-selected groups of said signals;
   means varying said spans, providing increased sensitivity to ambient and storage temperatures;
   means responsive to said signals within said temperature span, generating discrete signals corresponding to heater power levels;
   means responsive to said power signals for energizing the heater at said power levels;
   means enabling said energizing means during each said "power-on" period;
   wherein said ambient temperature spans vary controller response, and heater electrical power inputs to individual system requirements, and heating requirements for each succeeding "power-off" period.

6. The controller of claim 5, wherein said temperature responsive means are thermal switches, and said selective means is a mechanical adjustment of switch temperature actuation levels.

7. The controller of claim 5 wherein said enabling means is an electric clock.

* * * * *